United States Patent [19]
Doench

[11] 3,905,014
[45] Sept. 9, 1975

[54] POWER SUPPLY WARNING DEVICE FOR MARINE AND LAND VEHICLES

[75] Inventor: Thomas Judson Doench, Dayton, Ohio

[73] Assignee: Omnifac Corporation, Dayton, Ohio

[22] Filed: Apr. 18, 1974

[21] Appl. No.: 461,847

[52] U.S. Cl. .............................. 340/52 D; 340/333
[51] Int. Cl.[2] ......................................... G08B 21/00
[58] Field of Search ........ 340/52 R, 52 D, 52 F, 53, 340/213 R, 419, 421, 333; 200/51.10, 51.09, 61.19, 61.58 R; 307/10 BP

[56] References Cited
UNITED STATES PATENTS
2,067,653   1/1937   Witmer et al. ...................... 340/333
3,815,110   6/1974   Davidson ........................ 340/213 R Primary Examiner—Alvin H. Waring
Attorney, Agent, or Firm—Biebel, French & Bugg

[57] ABSTRACT

A warning is provided if the ignition circuit is energized for propelling a marine or land vehicle while the vehicle is still connected to an external standard domestic power supply. Interlocks may also be provided to prevent starting or operating the vehicle until disconnected from the supply.

14 Claims, 6 Drawing Figures

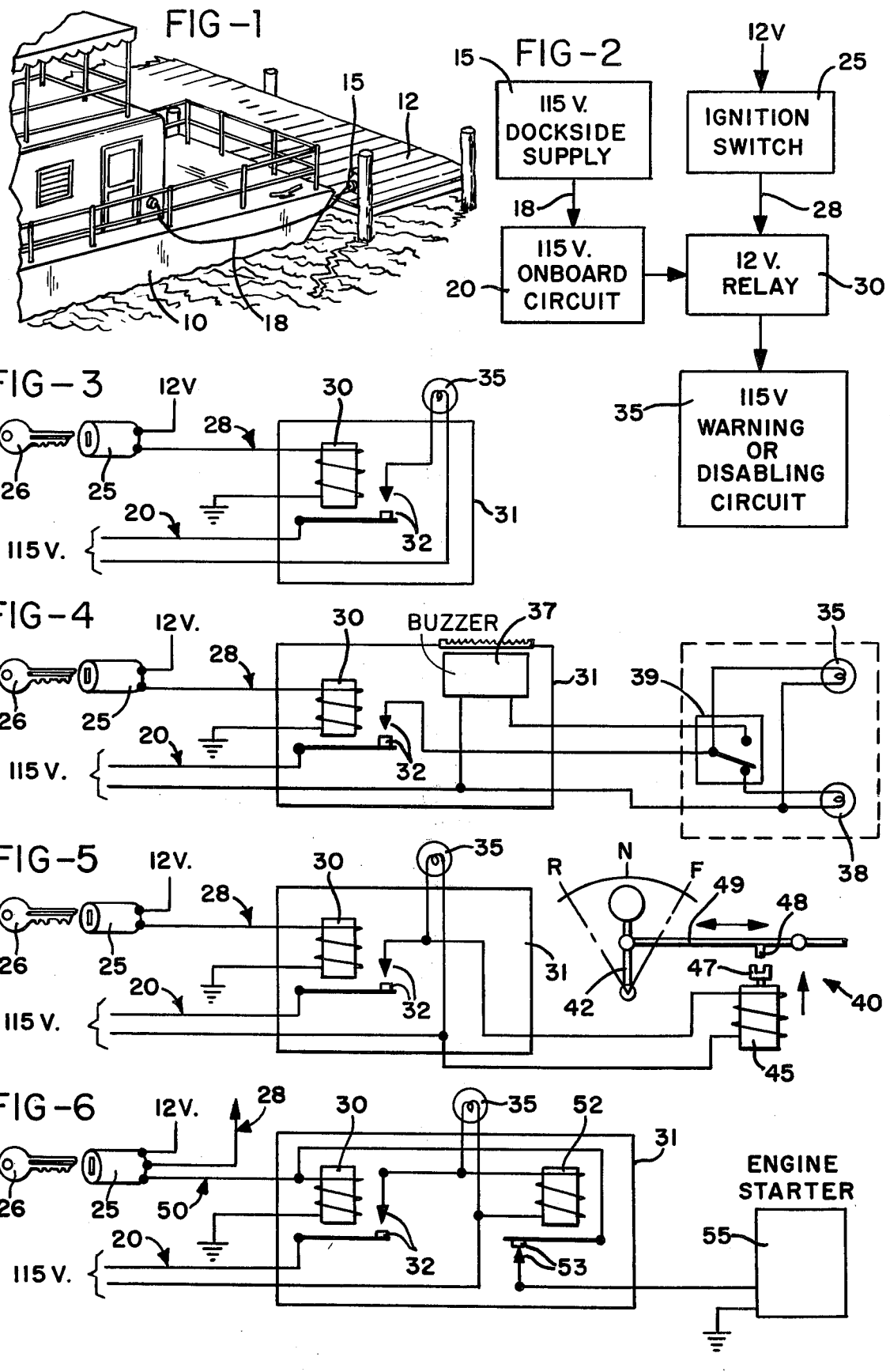

3,905,014

POWER SUPPLY WARNING DEVICE FOR MARINE AND LAND VEHICLES

BACKGROUND OF THE INVENTION

The present invention relates to power supply warning devices and more particularly to a warning device for use on marine or land vehicles generally of the dwelling or recreational type. In addition to on board power and propulsion systems, such vehicles commonly include higher voltage accessory circuits for use when the vehicle is stationary. These circuits are for operating standard 110–120 volt AC appliances and are usually connected to an external standard domestic power supply of about 110–120 volts AC.

As owners of such vehicles will attest, it is not uncommon to forget to unplug the accessory circuit from the external power supply before driving away. This is particularly true when the vehicle has been parked or docked for some time and the owner's mind has strayed to other matters. Even the usual departure preparations are not a sufficient reminder since the external power supply may be left connected as long as possible for the sake of convenience. When the vehicle is then put in motion, the cord is torn from the outlet.

Needless to say, such accidents cause considerable distress, but until now the need for a device to prevent such accidents has gone unanswered.

SUMMARY OF THE INVENTION

Briefly, the present invention warns the vehicle operator whenever the vehicle's ignition circuit is energized if, at the same time, the high voltage accessory circuits are still energized by the external standard domestic power supply. In the preferred embodiment, a low voltage relay is energized by the ignition circuit to complete a high voltage warning circuit. The high voltage warning circuit is powered by the vehicle's accessory circuits so that if power is present from the external domestic power supply the warning device is activated. When the ignition is off, no portions of the circuit are activated. Power consumption is therefore minimized, as are the risks of failure, fire, and so on.

In the simplest configuration, the warning device is a 115 volt indicator lamp which is preferably located near the ignition switch. The warning device may also include other indicators such as audio devices (horn or buzzer), and/or safety interlocks (to disable the vehicle's propulsion system). Examples of such interlocks include a shifter lock, to keep the vehicle shift mechanism in neutral until the external domestic power supply is disconnected, and a starter interlock to prevent starting the engine until the external power supply is disconnected.

It is therefore an object of the present invention to provide a power supply warning device for land or marine vehicles; a power supply warning device which provides a warning if the vehicle propulsion system is energized while the vehicle is connected to an external standard domestic power supply; a power supply warning device which may also include safety interlocks to prevent operation of the vehicle while connected to such an external standard domestic power supply; a power supply warning device which is compact, inexpensive, and reliable; and to accomplish the above objects and purposes in a configuration particularly well adapted for convenient and economical use on a wide variety of marine and land recreational vehicles.

Other objects and advantages of the invention will be apparent from the following description, the accompanying drawings and the appended claims.

BRIEF DESCRIPTION OF THE DRAWINGS

FIG. 1 is a perspective view of a portion of a houseboat and dock, showing the houseboat untied from the dock and about to pull away, but still connected to an external dock side supply of standard domestic electric power;

FIG. 2 is a block diagram of the power supply warning device;

FIG. 3 is a schematic diagram of a first embodiment of the power supply warning device;

FIG. 4 is a schematic illustration of a second embodiment incorporating a warning buzzer;

FIG. 5 is a schematic illustration of a third embodiment incorporating a device for locking the houseboat shifting mechanism, and FIG. 6 is a schematic illustration of a fourth embodiment incorporating a device for interrupting power to the starting mechanism of the vehicle's engine.

DESCRIPTION OF THE PREFERRED EMBODIMENT

FIG. 1 illustrates a houseboat 10 adjacent a dock 12 and connected to a dockside power supply 15 by a power line 18. The dockside power supply provides an external source of standard domestic electric power in the customary range of 110–120 volts AC. Line 18 delivers the power to conventional accessory circuits 20 (FIG. 2) located on board boat 10. The on board circuits may be considered high voltage circuits since the voltage therein is approximately 10 times greater than the 12 volt DC internal power supply which is customary on such vehicles.

The 12 volt DC internal power supply is part of the houseboat's propulsion system (not shown), and includes an ignition switch 25. Switch 25 may be operated by an ignition key 26, and is connected to control the vehicle propulsion system in the usual fashion. Switch 25 thus controls a low voltage circuit 28 which is powered from the vehicle's internal 12 volt DC power supply.

In the preferred embodiment, a 12 volt relay 30 in a housing 31 is controlled by the low voltage circuit 28 to close a pair of contacts 32 when circuit 28 is energized by ignition switch 25. Contacts 32, in turn, are connected to the on board high voltage accessory circuit 20, and when closed, complete a circuit to a warning device such as a warning indicator lamp 35. Thus, if circuit 20 is still connected to the dockside power supply 15 by power supply line 18, lamp 35 will be lighted when the low voltage ignition circuit 28 is energized. If either the low voltage ignition circuit 28 or the high voltage accessory circuit 20 is not energized, the warning lamp will not be activated.

Thus when the operator of the houseboat 10 turns on the ignition, he will be warned against moving the houseboat if the houseboat is still connected to the dockside power supply 15. Since both circuits are energized he is warned to disconnect the on board high voltage accessory circuit 20 from supply 15.

FIG. 4 illustrates another embodiment in which a buzzer 37 or a "buzzer off" lamp 38 is activated in addition to the warning lamp 35. A switch 39 permits the operator to choose between the buzzer and the "buzzer off" lamp. By this means an audio as well as a visual warning may be provided to prevent the houseboat from being driven off until it has been disconnected from the dockside power supply 15.

FIG. 5 illustrates an optional shift locking mechanism 40. Most self-propelled vehicles, such as houseboat 10, include a shift mechanism which has a neutral position. In FIG. 5, the shift lever 42 is shown in the neutral position, and a shift lock solenoid 45 is connected in parallel with warning lamp 35. Thus when both the low and high voltage circuits 28 and 20 are energized, warning lamp 35 is illuminated and solenoid 45 moves a latch 47 thereon into engagement with a pin 48 connected to the shift lever linkage 49. Linkage 49 and lever 42 will then be immobilized and locked in the neutral position until either circuit 20 or 28 is deenergized. An advantage of this interlock is that the engine may be warmed up, but the vehicle cannot be driven until it is disconnected from the dock side power supply 15.

FIG. 16 illustrates another embodiment in which the engine starting circuit 50 serves as an alternate low voltage circuit and is used in place of the ignition circuit 28 to interrupt power to the engine starter 55 when circuit 20 is energized. In this embodiment circuit 50 energizes relay 30 to close contacts 32 whenever the ignition switch 25 is moved to the "start" position. If circuit 20 is still connected to the dock side power supply, then power to the engine starter 55 is interrupted by a relay 52 which opens contacts 53 in circuit 50 to prevent power from reaching starter 55. Thus, when the low voltage starter circuit 50 and the on board accessory circuit 20 are both energized, the normally closed contacts 53 of relay 52 are opened, making it impossible to start the boat engine. Of course, any conventional starter switch other than switch 25 may be used.

As may be seen, therefore, the present invention provides numerous advantages. For example, although it has been illustrated in conjunction with an internal combustion propulsion system having an ignition circuit, it may be used with other conventional systems such as electric motors. It may also be readily adapted for use between trailers, which are not themselves self-propelled, and vehicles used for pulling such trailers.

Several combinations of warning and interlock devices have been illustrated, and it is clear that others may be used as appropriate to the circumstances. Furthermore, it is not necessary to use mechanical relays such as relays 30 and 52. Any appropriate electrical or electronic switching device, such as transistors, silicon controlled rectifiers, and so on, may be employed.

In the preferred embodiment, relay 30 is energized by the 12 volt ignition circuit 28. If desired, it is of course possible to use a relay energized by the on board high voltage accessory circuit 20 to complete a connection from the low voltage ignition circuit 28 to a warning device similar to lamp 35.

While the forms of apparatus herein described constitute preferred embodiments of the invention, it is to be understood that the invention is not limited to these precise forms of apparatus, and that changes may be made therein without departing from the scope of the invention.

What is claimed is:

1. For use in combination with a marine or land vehicle having a low voltage circuit powered from a low voltage power supply, propulsion means connected to the low voltage circuit, and a high voltage circuit for connection to an external standard domestic power supply, a power supply warning device comprising:
   a. warning means connectable to one of said low voltage or said high voltage circuits, and
   b. means operated by the other of said circuits in response to energization of said other circuit to connect said warning means to said one circuit to cause said warning means to warn against moving the vehicle when both said circuits are energized and to warn to disconnect the high voltage circuit from the external domestic power supply.

2. The power supply warning device of claim 1 wherein the low voltage circuit further comprises an ignition circuit.

3. The power supply warning device of claim 1 wherein the low voltage circuit further comprises a starter circuit.

4. The power supply warning device of claim 1 wherein said warning means includes both visual and audial warning devices.

5. The power supply warning device of claim 1 wherein said warning means further comprises disabling means for disabling at least a portion of the vehicle propulsion means when both said circuits are energized.

6. The power supply warning device of claim 5 wherein the vehicle propulsion means includes a direction shifting mechanism having a neutral position, and wherein said disabling means further comprises means for locking the shifting mechanism in neutral when both said circuits are energized.

7. The power supply warning device of claim 5 wherein the vehicle propulsion means includes a starter mechanism, and wherein said disabling means further comprises means for interrupting power to the starter mechanism when both said circuits are energized.

8. For use in combination with a marine or land vehicle having a low voltage circuit powered from a low voltage power supply, propulsion means connected to the low voltage circuit, and a high voltage circuit for connection to an external standard domestic power supply, a power supply warning device comprising:
   a. warning means connectable to and powered by the high voltage circuit, and
   b. means operated by the low voltage circuit in response to energization thereof to connect said warning means to the high voltage circuit to cause said warning means to warn against moving the vehicle when the high voltage circuit is connected to an external domestic power supply.

9. The power supply warning device of claim 8 wherein said warning means further comprises disabling means for disabling at least a portion of the vehicle propulsion means when said warning means is connected to the high voltage circuit and the high voltage circuit is connected to an external domestic power supply.

10. For use in combination with a self-propelled marine or land vehicle having an internal DC power supply, and internal combustion engine for propelling the vehicle, a DC starter and starter circuit for the engine, an ignition circuit for the engine powered by the DC power supply, a direction shifting mechanism having a neutral position, and an accessory circuit for connection to an external standard domestic power supply of approximately 110–120 volts AC, a power supply warning device comprising:
 a. warning indicator means for indicating that the accessory circuit is connected to an external standard domestic power supply, and
 b. DC relay means operated by one of the ignition and starter circuits to connect said warning indicator means to the accessory circuit when the one circuit is energized, to warn to disconnect the accessory circuit from the external domestic power supply when so connected.

11. The power supply warning device of claim 10 wherein said warning indicator means further comprises:
 a. indicator bulb and buzzer means, and
 b. disabling means for disabling at least a portion of the vehicle propulsion means when the one circuit is energized and the accessory circuit is connected to an external domestic power supply.

12. The power supply warning device of claim 11 wherein said disabling means further comprises latch and pin means for locking the shifting mechanism in neutral when the ignition circuit is energized and the accessory circuit is connected to an external domestic power supply.

13. The power supply warning device of claim 11 wherein said disabling means further comprises means for interrupting power to the engine starter when the starter circuit is energized and the accessory circuit is connected to an external domestic power supply.

14. The power supply warning device of claim 11 wherein said disabling means further comprises means for interrupting power to the engine starter when the ignition circuit is energized and the accessory circuit is connected to an external domestic power supply.

* * * * *